(12) United States Patent
Li et al.

(10) Patent No.: US 12,346,286 B2
(45) Date of Patent: Jul. 1, 2025

(54) TWO-DIMENSIONAL PROCESSING ARRAY WITH A VERTICALLY STACKED MEMORY TILE ARRAY

(71) Applicant: ALIBABA (CHINA) CO., LTD., Zhejiang Province (CN)

(72) Inventors: Shuangchen Li, Sunnyvale, CA (US); Zhe Zhang, Shanghai (CN); Dimin Niu, San Mateo, CA (US); Hongzhong Zheng, Los Gatos, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 86 days.

(21) Appl. No.: 18/064,520

(22) Filed: Dec. 12, 2022

(65) Prior Publication Data
US 2024/0054096 A1 Feb. 15, 2024

(30) Foreign Application Priority Data
Aug. 12, 2022 (CN) .......................... 202210967128.X

(51) Int. Cl.
*G06F 15/78* (2006.01)
*G06F 12/0813* (2016.01)
*G06F 15/173* (2006.01)
*G06F 15/80* (2006.01)

(52) U.S. Cl.
CPC .... *G06F 15/17381* (2013.01); *G06F 12/0813* (2013.01); *G06F 15/7807* (2013.01); *G06F 15/7825* (2013.01); *G06F 15/8023* (2013.01)

(58) Field of Classification Search
CPC ............. G06F 15/7825; G06F 15/7807; G06F 15/8023
See application file for complete search history.

(56) References Cited

U.S. PATENT DOCUMENTS

| | | | | |
|---|---|---|---|---|
| 8,327,187 | B1* | 12/2012 | Metcalf | H04L 49/109 |
| | | | | 714/10 |
| 11,126,550 | B1* | 9/2021 | Yeung | G06F 12/0802 |
| 2009/0260013 | A1* | 10/2009 | Heil | G06F 9/3888 |
| | | | | 718/103 |
| 2017/0185449 | A1* | 6/2017 | Zhang | G06F 9/505 |
| 2019/0065146 | A1* | 2/2019 | Heddes | G06F 7/483 |
| 2019/0079903 | A1* | 3/2019 | Dreyer | G06F 15/8076 |
| 2023/0297269 | A1* | 9/2023 | Dally | G06F 3/0679 |
| | | | | 711/154 |
| 2023/0315651 | A1* | 10/2023 | Dally | G06N 3/088 |
| | | | | 711/5 |

* cited by examiner

*Primary Examiner* — Jacob Petranek
(74) *Attorney, Agent, or Firm* — WPAT, P.C.; Anthony King

(57) ABSTRACT

The present disclosure discloses a processor. The processor is used to perform parallel computation and includes a logic die and a memory die. The logic die includes a plurality of processor cores and a plurality of networks on chip, wherein each processor core is programmable. The plurality of networks on chip are correspondingly connected to the plurality of processor cores, so that the plurality of processor cores form a two-dimensional mesh network. The memory die and the processor core are stacked vertically, wherein the memory die includes a plurality of memory tiles, and when the processor performs the parallel computation, the plurality of memory tiles do not have cache coherency; wherein, the plurality of memory tiles correspond to the plurality of processor cores in a one-to-one or one-to-many manner.

14 Claims, 10 Drawing Sheets

TWO-DIMENSIONAL PROCESSING ARRAY WITH A VERTICALLY STACKED MEMORY TILE ARRAY

CROSS-REFERENCE TO RELATED APPLICATIONS

This application claims priority to PRC Patent Application No. 202210967128.X filed Aug. 12, 2022, which is incorporated herein by reference for all purposes.

TECHNICAL FIELD

The present application relates to a processor, and particularly to a processor for use in machine learning algorithm and can perform parallel streaming process of data.

BACKGROUND

Artificial neural network (ANN), is a hot research topic in the field of artificial intelligence since 1980s. It abstracts the neuronal network of human brain from the perspective of information processing, and builds some simple models to form different networks with different connections. In engineering and academic fields, it is often referred to as neural networks or neural-like networks. A neural network is a computation model consisting of a large number of nodes (or neurons) interconnected with each other. The current neural networks are based on a central processing unit (CPU) or a graphics processing unit (GPU); however, such operations are power intensive, data intensive and computationally time-consuming.

SUMMARY

The embodiment of the present disclosure relates to a processor characterized in that the processor is used for performing parallel computation. The processor includes a logic die and a memory die, and the memory die and the processor core are vertically stacked. The logic die includes a plurality of processor cores and a plurality of networks on chip; each processor core is programmable; the plurality of networks on chip are correspondingly connected to the plurality of processor cores, so that the plurality of processors form a two-dimensional mesh network. The memory die includes a plurality of memory tiles, which correspond to the plurality of processor cores in a one-to-one or one-to-many manner; when the processor performs parallel computation, the multiple memory tiles do not need to have cache coherency.

The logic die of the processor of the present disclosure includes a plurality of processor cores for performing parallel computation to reduce the computation time. In addition, the logic die and memory die are stacked vertically in a three-dimensional space, allowing for a high-performance processor in a smaller area.

BRIEF DESCRIPTION OF THE DRAWINGS

Aspects of the present disclosure are best understood from the following detailed description when read with the accompanying figures. It should be noted that, in accordance with the standard practice in the field, various structures are not drawn to scale. In fact, the dimensions of the various structures may be arbitrarily increased or reduced for the clarity of discussion.

DETAILED DESCRIPTION

Figure 1:
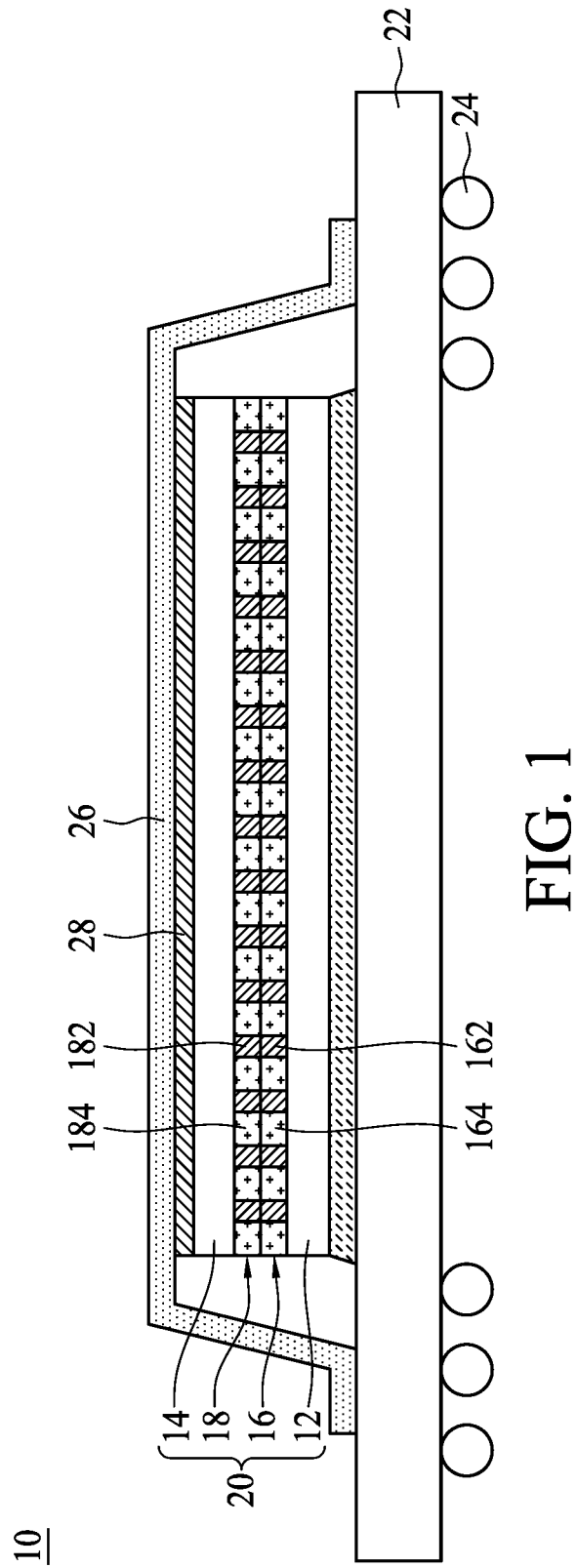
FIG. 1 is a cross-sectional view of a three-dimensional integrated circuit package according to embodiments of the present application.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in various examples. This repetition is for the purpose of simplicity and clarity and does not in itself dictate a relationship between the various embodiments and/or configurations discussed.

Moreover, spatially relative terms, such as "beneath," "below," "lower," "above," "upper," "on" and the like, may be used herein for ease of description to describe one element or feature's relationship to another element(s) or feature(s) as illustrated in the figures. These spatially relative terms are intended to encompass different orientations of the device in use or operation in addition to the orientation depicted in the drawings. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer or section from another. For example, the terms such as "first", "second", and "third" when used herein do not imply a sequence or order unless clearly indicated by the context.

As used herein, the singular forms "a," "an" and "the" are intended to include the plural forms as well, unless the context clearly indicates otherwise. The term "connect," and its derivatives, may be used herein to describe the structural relationship between components. The term "connected to" may be used to describe two or more components in direct physical or electrical contact with each other. The term "connected to" may also be used to indicate that two or more components are in direct or indirect (with intervening components therebetween) physical or electrical contact with each other, and/or that the two or more components collaborate or interact with each other.

Machine learning algorithms are algorithms that can be learned based on a set of data. Embodiments of machine learning algorithms can be designed to model higher order abstractions within a data set. The accuracy of a machine learning algorithm can be greatly influenced by the quality of the data set on which said algorithm is trained. The training process can be computationally intensive and the execution of machine learning computations on a conventional general purpose processor can be time intensive; therefore, the use of parallel processing hardware for training machine learning algorithms can be particularly useful for optimizing the training of neural networks. The present application proposes solutions that not only simultaneously take into account the performance of the processor in performing machine learning computations, but also store the large amount of data generated when the processor performs machine learning computations to avoid storage space and bandwidth from becoming a bottleneck in performance. Secondly, by setting the memory outside the processor core and stacking the memory on top of the processor core in the form of a three-dimensional integrated circuit, the present application not only increases the storage space to obtain high bandwidth in a smaller area, but also reduces frequent remote data movement, thereby achieving the characteristics of data locality, thus improving the performance.

FIG. 1 is a cross-sectional view of a three-dimensional integrated circuit package 10 according to embodiments of the present application. The three-dimensional integrated circuit package 10 includes a logic die 12 and a memory die 14. The logic die 12 and the memory die 14 are connected to together via a connection structure 16 and a connection structure 18 to form a processor 20, for use in perform machine learning computation. In the present embodiment, the connection structures 16 and 18 can be coupled to each other by a hybrid bonding process, but the present application is not limited thereto. Compared to the arrangement of two-dimensional integrated circuits or 2.5-dimensional integrated circuits, the logic die 12 and the memory die 14 are vertically stacked in a three-dimensional space, which not only decreases the space and increases the packaging density, but also reduce the complexity of wirings, so that more signals can exist in the interface between the logic die 12 and the memory die 14, thereby further reducing the length of connection line so as to decrease the RC delay.

In FIG. 1, the memory die 14 is disposed above the logic die 12, and the memory die 14 can have a dimensional corresponding to the logic die 12. The connection structure 16 at the upper surface of the logic die 12 includes a metal pad 162 (e.g., copper pad) and a dielectric layer 164 surrounding the metal pad 162, the connection structure 18 at the lower surface of the memory die 14 includes a metal pad 182 and a dielectric layer 184 surrounding the metal pad 182; the hybrid bonding process includes a process for fuse-melting the dielectric layer 164 and the dielectric layer 184 and a process for bonding the metal pad 162 and the metal pad 182. Compared to the convectional welding process, the hybrid bonding process can have higher current loading capacity and better thermal performance.

The processor 20 can be further coupled to a substrate 22. The substrate 22 can be a semiconductor substrate (e.g., a silicon substrate), an intermediate layer or a printed circuit board, etc. Discrete passive devices such as resistors, capacitors, transformers, etc. (not shown) may also be coupled to the substrate 22. The three-dimensional integrated circuit package 10 may further include a solder ball 24 and a heat sink cover 26, with the solder ball 24 coupled to the substrate 22, wherein the processor 20 and the solder balls 24 are located on opposite sides of the substrate 22. The heat sink cover 26 is mounted on the substrate 22 and wraps around the processor 20. The heat sink cover 26 may be formed using a metal, metal alloy, etc., such as a metal selected from the group consisting of aluminum, copper, nickel, cobalt, etc.; the heat sink cover 26 may also be formed from a composite material selected from the group consisting of silicon carbide, aluminum nitride, graphite, etc. In some embodiments, an adhesive 28 may be provided on top of the processor 20 for adhering the heat sink cover 26 to the processor 20 to improve the stability of the three-dimensional integrated circuit package 10. In some embodiments, the adhesive 28 may have a good thermal conductivity so as to accelerate the dissipation of heat energy generated during operation of the processor 20. In some embodiments, the memory die 14 may be arranged below the logic die 12 such that the memory die 14 is located between the logic die 12 and the substrate 22.

Figure 2:
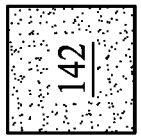
FIG. 2 is a top-view of a memory die according to the present application.

FIG. 2 is a functional block diagram of the memory die 14 shown in FIG. 1. The memory die 14 includes a plurality of memory tiles 142, these memory tiles 142 do not have cache coherency, meaning that the data and/or one or more data operations between these memory tiles 142 are independent to each another. The memory tiles 142 can have the same capacity. The memory tiles 142 may be arranged in a matrix. As an example but not limitation, the memory tiles 142 can be a dynamic random access memory (DRAM) or static random access memory (SRAM). Generally, each bit of SRAM is composed of two types of transistors: a larger sized pMOS and a smaller sized nMOS. Each bit of DRAM is composed of a transistor and a capacitor; if the smaller sized nMOS is chosen for the transistors of DRAM and the capacitors are arranged above or below the transistors rather than side by side, the storage capacity of DRAM can be larger than that of DRAM for the same die area.

Figure 3:
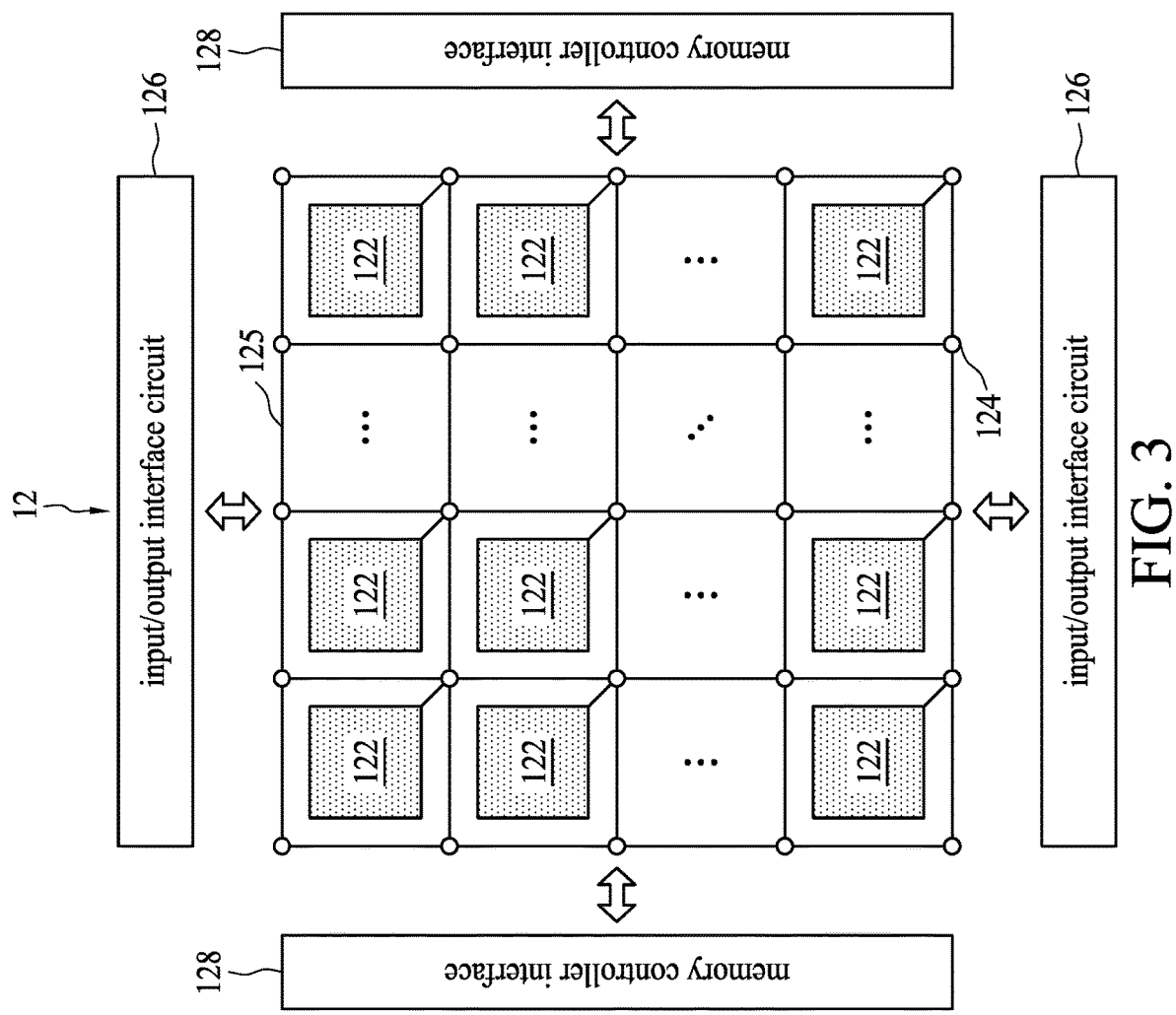
FIG. 3 is a top-view of a logic die according to the present application.

FIG. 3 is a functional block diagram of the logic die 12 shown in FIG. 1. The logic die 12 is a heterogeneous system and it includes a plurality of processor cores 122 and a plurality of networks on chip (NoC) 124; the plurality of processor cores 122 of the logic die 12 can be cores with the same configuration, functional units, and/or logic, and each processor core 122 has Turing completeness, which means that the processor cores 122 can be programmed, so that processor core 122 can do all the things that can be done with a Turing machine to solve all computable problems. In other words, the processor core 122 can act as a general-purpose computer. The logic core 12 can synchronize the plurality of processor cores 122 to perform different computational tasks in parallel, which means that the plurality of processor cores 122 form a parallel computation-centric streaming processing system. Further, each processor core 122 is programmable; each processor core 122 may be programmed, for example, but not limited to, in C or C++.

A plurality of processor cores 122 are used to compute in parallel and communicate via a plurality of networks on chip (NoC) 124 during the computation process or after the computation results are obtained. Each network on chip 124 is connected to one the processor core 122 and a plurality of networks on chip 124, and is configured to forward data from other processor cores 122 to the processor core 122 that it connected to via the data path 125 or the network on chip 124 connected to other processor cores 122. The data path 125 between any two network on chip 124 can includes a plurality of wires (e.g., the serial, parallel or serial and parallel signal path on the logic die 12) to support parallel channels in each direction. In certain embodiments, each network on chip 124 can be connected to for adjacent networks on chip 124 via the data path 125; in this way, the network on chip 124 connected to the processor core 122 can forward data the processor core 122 or forward data from the processor core 122 or forward data between adjacent processor cores 122 via the data path 125 of the two-dimensional mesh network. The two-dimensional mesh interconnect topology of the network on chip 124 and data path 125 may facilitate cyclic communication between the processor cores 122. In other embodiments, each processor core 122, in addition to connecting to other processor cores 122 via the network on chip 124, is also capable of connecting to the memory tiles 142 via the network on chip 124. Specific details regarding the processor cores 122, and the communication between the processor cores 122, the network on chip 124, and the memory tile 142 will be discussed below.

Each network on chip 124 connects a processor core 122 and multiple networks on chip 124 for forwarding data from other processor cores 122 via data paths 125 to the processor core 122 to which it is connected or to on-chip networks 124 connected to other processor cores 122. Data paths 125 between any two on-chip networks 124 may include multiple wires (e.g., logic serial, parallel, or serial and parallel signal paths on the core 12) to support parallel channels in each direction. In some embodiments, each on-chip network 124 may connect four adjacent on-chip networks 124 via data path 125, such that on-chip networks 124 connected to processor cores 122 may forward data to or from processor cores 122 or between adjacent processor cores 122 via data path 125 of the two-dimensional mesh network. The two-dimensional mesh interconnect topology of the on-chip network 124 and data path 125 may facilitate circular communication between processor cores 122. In other embodiments, each processor core 122 may be able to connect to memory block 142 via on-chip network 124 in addition to other processor cores 122. There are specific details regarding processor cores 122, and the manner of communication between processor cores 122, on-chip network 124, and memory block 142 that will be described below.

The data path 125 from the network edge may couple the processor core 122 to an off-chip circuit or communication channel interface. The off-chip circuitry may be, for example, a memory controller interface 128 to facilitate interfacing the processor 20 with a loadable expansion memory (not shown). The communication channel interface may include an input/output interface circuit 126 for coupling data into and out of the logic die 12. The input/output interface circuit 126 may be one of any number of standards-based communication link technologies or protocols, or may be a vendor-specific communication interface or communication architecture; in certain embodiments, the input/output interface circuit 126 may be a peripheral component interconnect express (PCIe), an Ethernet network, or an interconnect protocol developed internally by each vendor, such as NVLink.

In certain embodiments, an extended memory may provide additional storage for the processor 20, and the memory tiles 142 and the extended memory in the memory die 14 will operate as a combined memory. Specifically, when the processor core 122 attempts to store more data in the corresponding memory tile 142 than the capacity of this memory tile 142, the processor core 122 may communicate with the memory controller interface 128 via the network on chip 124 and data path 125 to determine whether the extended memory exists; if the extended memory does exist, then the processor core 122 may access the extended memory via the memory controller interface 128. In other embodiments, the extended memory may store applications (such as, but not limited to, programs for updating and maintaining the software of the processor 20) or other information for the microprocessor 20. Moreover, the processor core 122 may also access remote memory via the input/output interface circuit 126; for example, the processor core 122 may access the remote memory via the input/output interface circuit 126 based on the compute express link (CXL) protocol.

Figure 4:
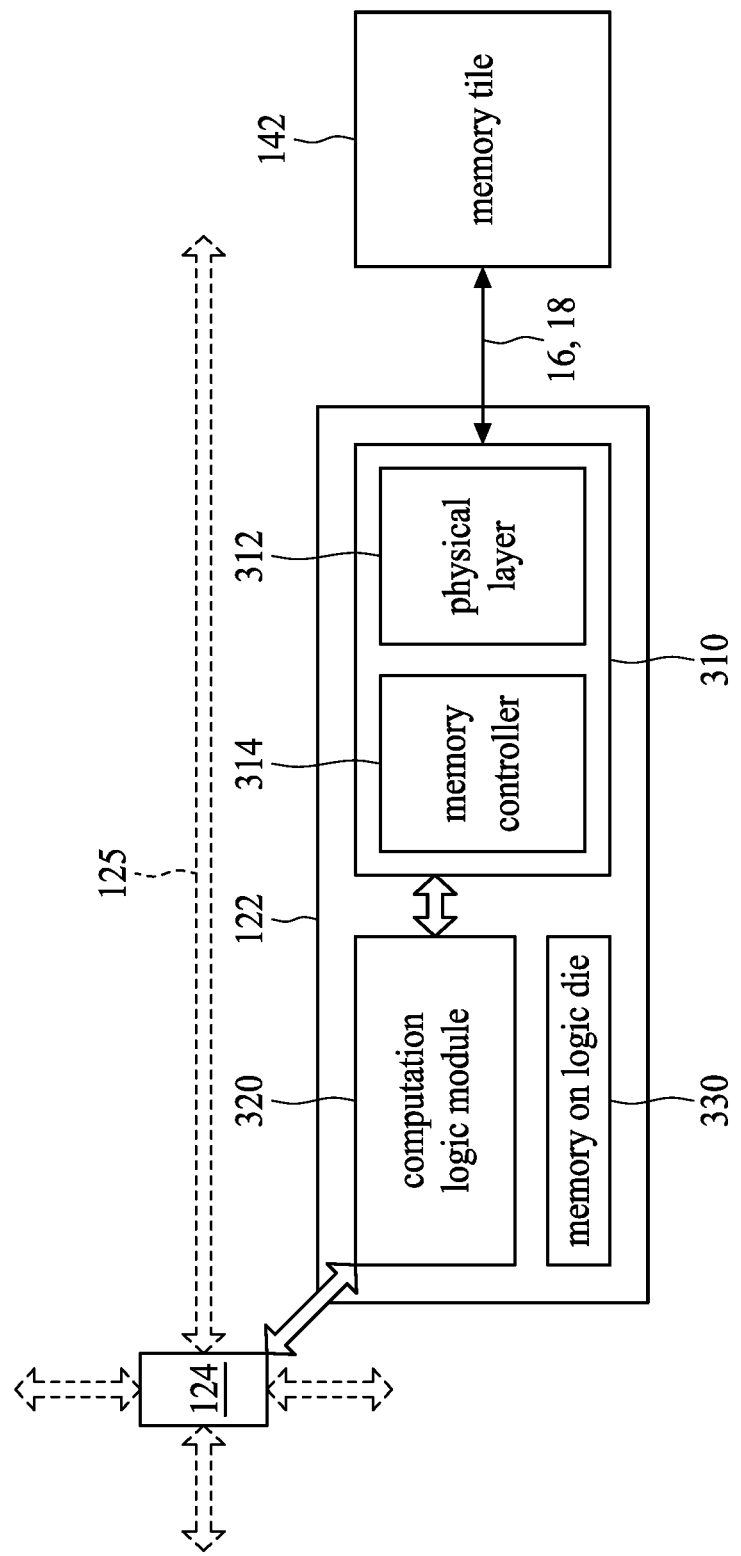
FIG. 4 is a schematic diagram illustrating the communication among a processor core, a network on chip and a memory tile according to a first embodiment.

FIG. 4 is a schematic diagram illustrating the communication between the processor core, network on chip and memory tile according to a first embodiment. Reference is made to FIG. 1 and FIG. 4; the memory tiles 142 is communicatively coupled to a single processor core 122 via the connection structure 16 and 18 shown in FIG. 1, and the number of the processor core 122 is equal to the number of the memory tile 142 to allow each process core 122 to have one dedicated memory tile 142; since the processor core 122 does not share the memory tile 142 with the other processor cores 122, during the computation process, each processor core 122 is able to access data in the dedicated memory tile 142 in real time, thereby increasing the computational speed and performance of the processor 20. Further, the processor core 122 may be arranged directly below the dedicated memory tile 142 and use the metal pads 162 and 182 arranged between the processor core 122 and the memory tile 142 to form an electric connection, so as to shorten the transmission path between the processor core 122 and the dedicated memory tile 142, thereby speeding up access to the data from the processor core 122 to the dedicated memory tile 142.

The processor core 122 includes a memory interface module 310, a computation logic module 320 and a memory on logic die 330; the computation logic module 320 is connected to the corresponding network on chip 124. The memory interface module 310 is used in accessing the memory tiles 142 and includes a physical layer 312 and a memory controller 314, wherein the memory controller 314 is coupled to the computation logic module 320; the physical layer 312, in addition to being coupled to the memory controller 314, can be further electrically coupled to the metal pads 162 and 182 of a portion of the connection structures 16 and 18; the memory controller 314 can provide the requested or data sent from the computation logic module 320 to the memory tile 142 via the physical layer 312, so that the computation logic module 320 in the processor core 122 can communicated with the dedicated memory tile 142. In this way, the intermediate or final computation results obtained when the computation logic module 320 uses the training data set to train the neural network or uses the trained deep neural network to implement the machine intelligence process can be stored in the memory tile 142; the aforementioned intermediate or final computation results can also be delivered to other processor cores 122 via the network on chip 124 to perform other computations. In FIG. 4, the memory interface module 310 includes the physical layer used to couple the corresponding memory tile 142 and the memory controller is arranged in the processor core 122; thus, only the computation logic module 320 connected to this memory interface module 310 is able to read and write to the memory tile 142 coupled thereto.

The memory on logic die 330 is used as a cache or scratchpad memory of the processor core 122 and can be coupled to the computation logic module 320. The capacity of the memory on logic die 330 is much smaller than that of the memory tiles 142. When the processor 20 performs parallel computation, a plurality of memories on logic die 330 of the plurality of processor cores 122 do not have cache coherency; that is, the data and/or data operations stored in the memory on logic die 330 by each processor core 122 are independent to each another. In certain embodiments, the memory on logic die 330 can be a static random access memory.

Figure 5:
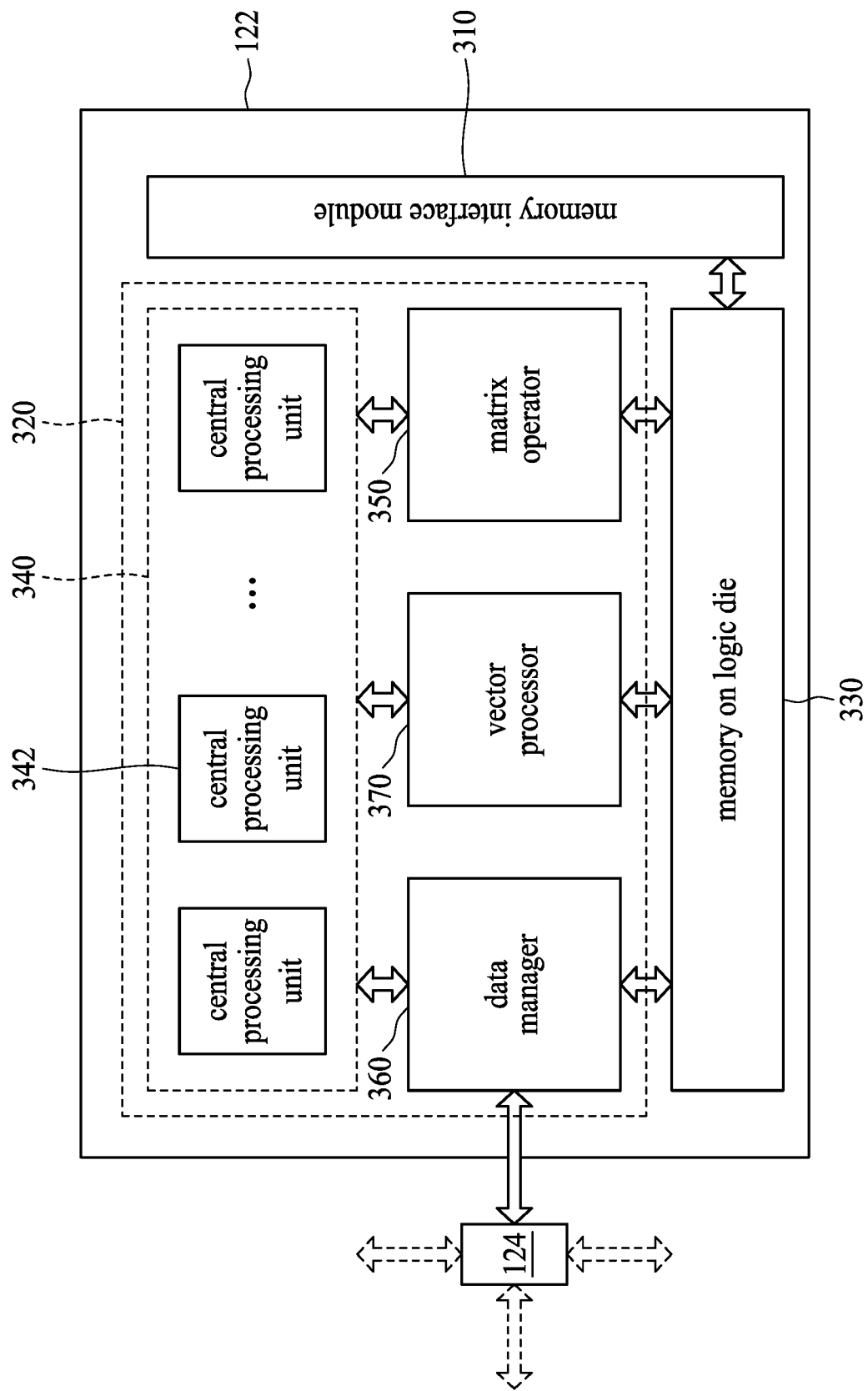
FIG. 5 is functional block diagram of processor core of a first embodiment of the present application.

FIG. 5 is a functional block diagram of a processor core. The computation logic module 320 in the processor core 122 is mainly used to handle a large number of matrix and vector computations, such as matrix multiplication, matrix addition, vector multiplication, vector reduction, and in order to handle such a large number of computations, the computation logic module 320 in the processor core 122 includes a central processing unit cluster 340, a matrix operator 350, a data manager 360 and the vector processor 370. The central processing unit cluster 340 is used to control operations, and the matrix operator 350 and vector processor 370 are used to perform various types of processing operations in parallel.

The central processing unit cluster 340 includes a plurality of central processing units 342, wherein these central processing units 342 may be interconnected via wires, and are used in parallel control operation. A plurality of central processing units 342 in the central processing unit cluster 340 have substantially the same operational capability so that they are suitable for executing the control logic of different subtasks in parallel. The number of central processing units 342 may be determined based on the service requirements of the processor core 122 and the real-time performance parameters of all central processing units 342 in the central processing unit cluster 340. The central processing unit cluster 340 may use each and every scheduling and/or work distribution algorithm to allocate work to matrix operators 350 and vector processors 370, wherein these algorithms may vary depending on the workload caused by the program or computation of each type, so that the matrix operators 350 and vector processors 370 can accomplish parallel processing operations. The central processing unit cluster 340 in each processor core 122 illustrated in FIG. 3 may include the same number of central processing units 342 such that the same computational results can be provided for the same instructions and data.

The matrix operator 350 is coupled between the central processing unit cluster 340 and the memory interface module 310 and can be used to perform matrix computations, such as general matrix to matrix multiplication (GEMM) computations. Specifically, because the essence of artificial intelligence is to optimally extract features from various data, and the matrices can store each type of data very conveniently, the basis of neural network algorithms is matrix computations; in other words, compared to other non-artificial intelligence algorithms, neural network algorithms involve a large number of matrix or even multidimensional matrix computations. Although the central processing unit 342 can be used to perform matrix operations, the central processing unit 342 is not designed for efficient execution of matrix operations, which increases the processing wait time for operations involving large multidimensional matrix operands. The use of a matrix operator 350 specifically designed to perform matrix multiplication and convolution computations allows for more efficient processing of large multidimensional matrices than performing matrix computations in the central processing unit 342, thereby increasing the efficiency of matrix computations and reducing the power consumption and time for the processor 20 to perform matrix computations.

The vector processor 370 is coupled to the central processing unit cluster 340 and the memory interface module 310, and is used in perform vector computation. Neural network algorithms usually contain a large number of vector computations, and although the central processing unit 342 can be used to perform vector computations, the central processing unit 342 is not designed for efficient execution of vector computations and has a low computational performance when performing vector computations. Therefore, the vector processor 370 is used in the computation logic module 320 of the processor core 122 for vector computations, thereby improving the performance of performing vector computation tasks.

The data manager 360 is coupled to the network on chip 124, the central processing unit cluster 340, and the memory interface module 310, and is used for processing the instructions and data entering the processor core 122 via the network on chip 124, sending the control logic and data integral to the control logic to the central processing unit cluster 340, and storing other data to the memory on logic die 330; the matrix operator 350 and vector processor 370 extract the corresponding data from the memory on logic die 330 to perform process operations when performing subtasks assigned by the central processing unit cluster 340.

Figure 6:
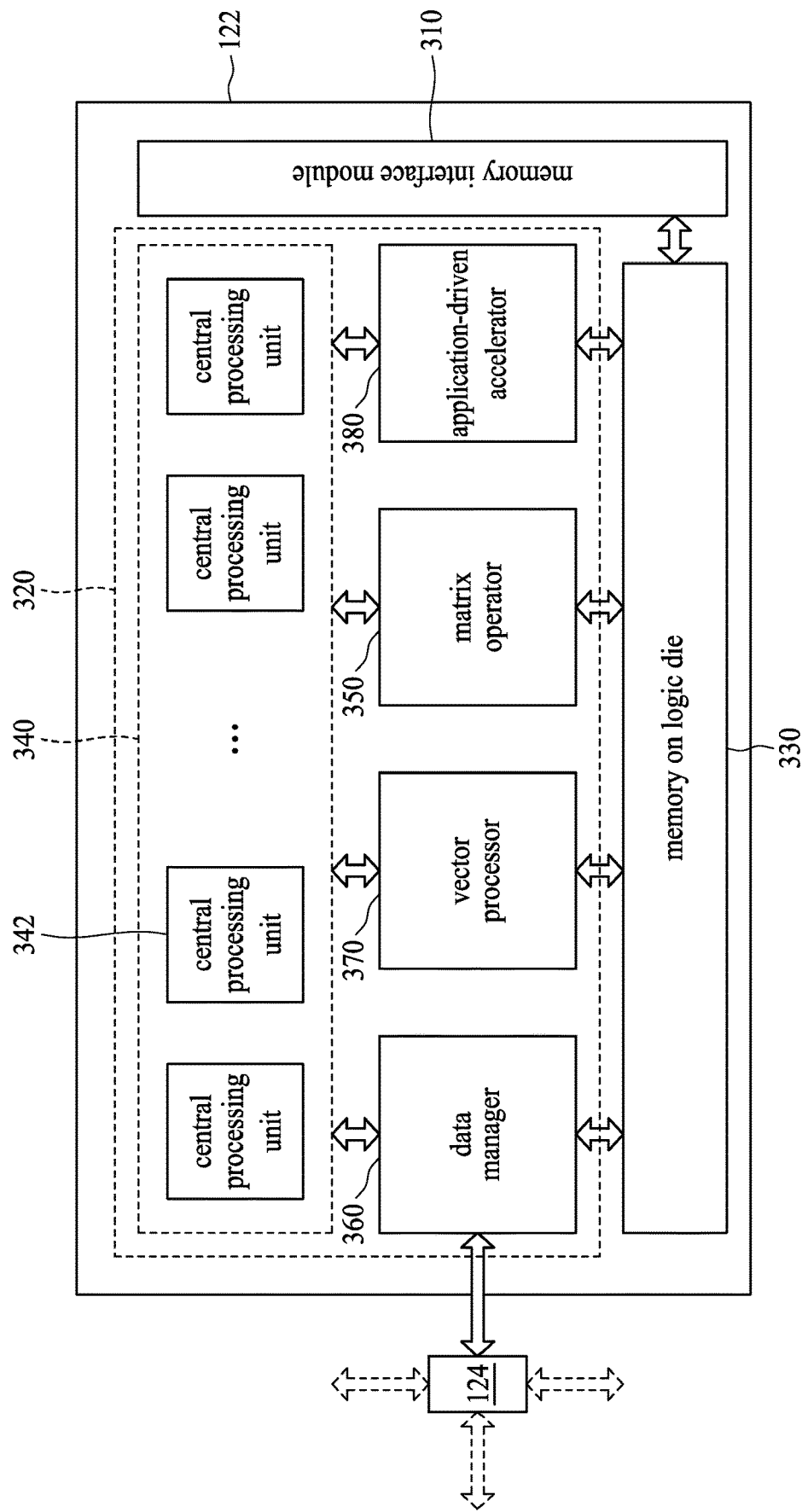
FIG. 6 is functional block diagram of processor core of a second embodiment of the present application.
Figure 7:
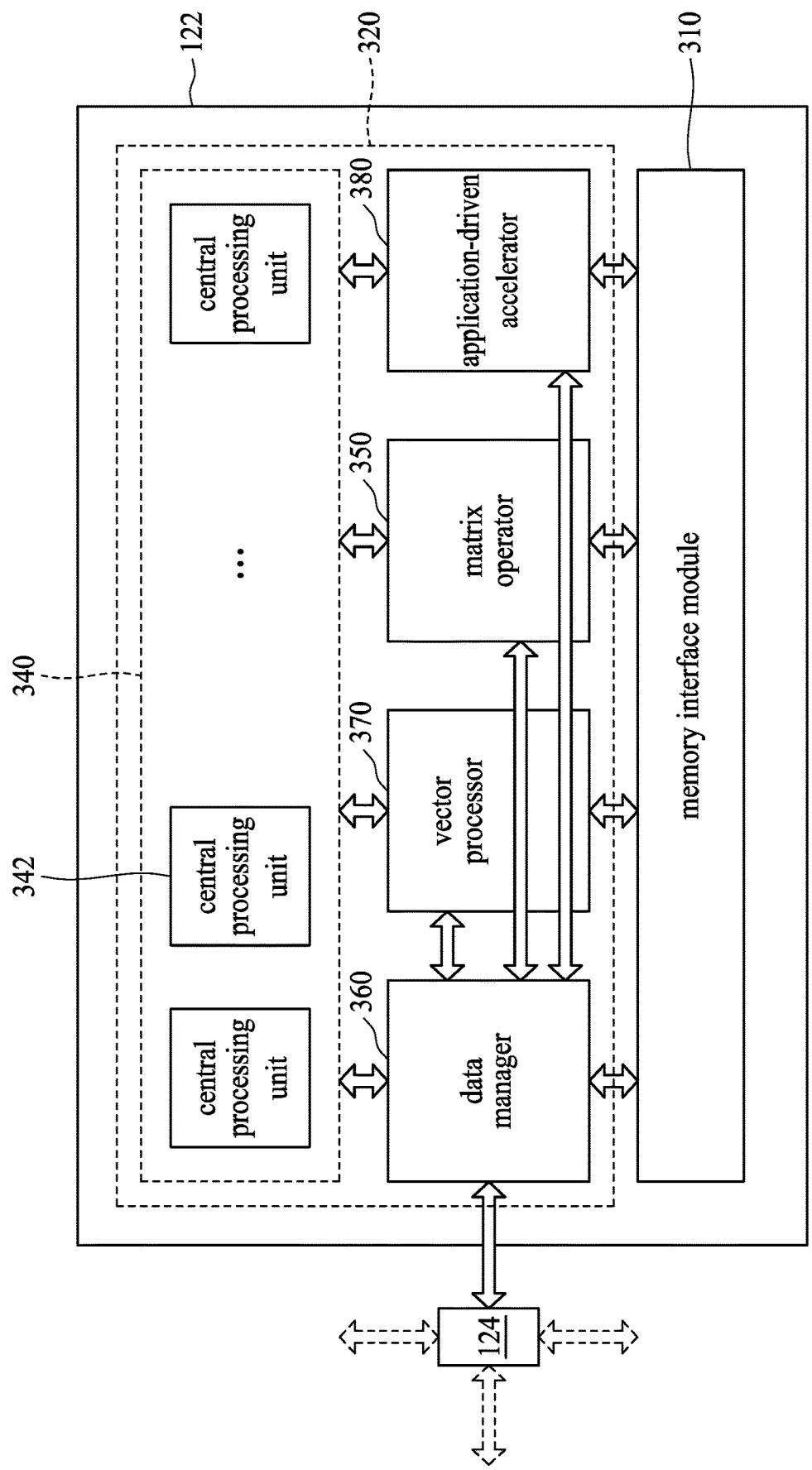
FIG. 7 is functional block diagram of processor core of a third embodiment of the present application.

In certain embodiments, the computation logic module 320 in the processor core 122 may also be additionally installed with one or more application-driven accelerators 380 (as shown in FIG. 6) depending on the needs, which is coupled to the memory interface module 310 and the central processor cluster 340, and configured to perform computations on data in a specific format to improve the overall performance of the processor core 122 and reduce power consumption; the application-driven accelerator 380 may include graphics accelerator, computation accelerator, and/or video processors; in some examples, the application-driven accelerator 380 may be implemented using an application-specific integrated circuit (ASIC) and/or a field-programmable array (FPGA). In particular, in some embodiments, the memory on logic die 330 in the processor core 122 may be omitted, as shown in FIG. 7. In FIG. 7, the data manager 360 is coupled to the network on chip 124, the memory interface module 310, the central processing unit cluster 340, the matrix operator 350, the vector processor 370, and the application-driven accelerator 380; different forms of data entering processor core 122 from the network on chip 124 are sent by the data manager 360 directly to the matrix operator 350, vector processor 370, and application-driven accelerator 380 that can perform high-efficiency processing of a specific form of data; this means that when the processor core 122 shown in FIG. 7 performs a task, it does not spend time in storing data from the network on chip 124 in the memory on logic die 330 and the matrix processor 350, vector processor 370, and application-driven accelerator 380 do not spend time in extracting data required for computation from the memory on logic die 330, and therefore can have higher performance than the processor core 122 shown in FIG. 5.

Figure 8:
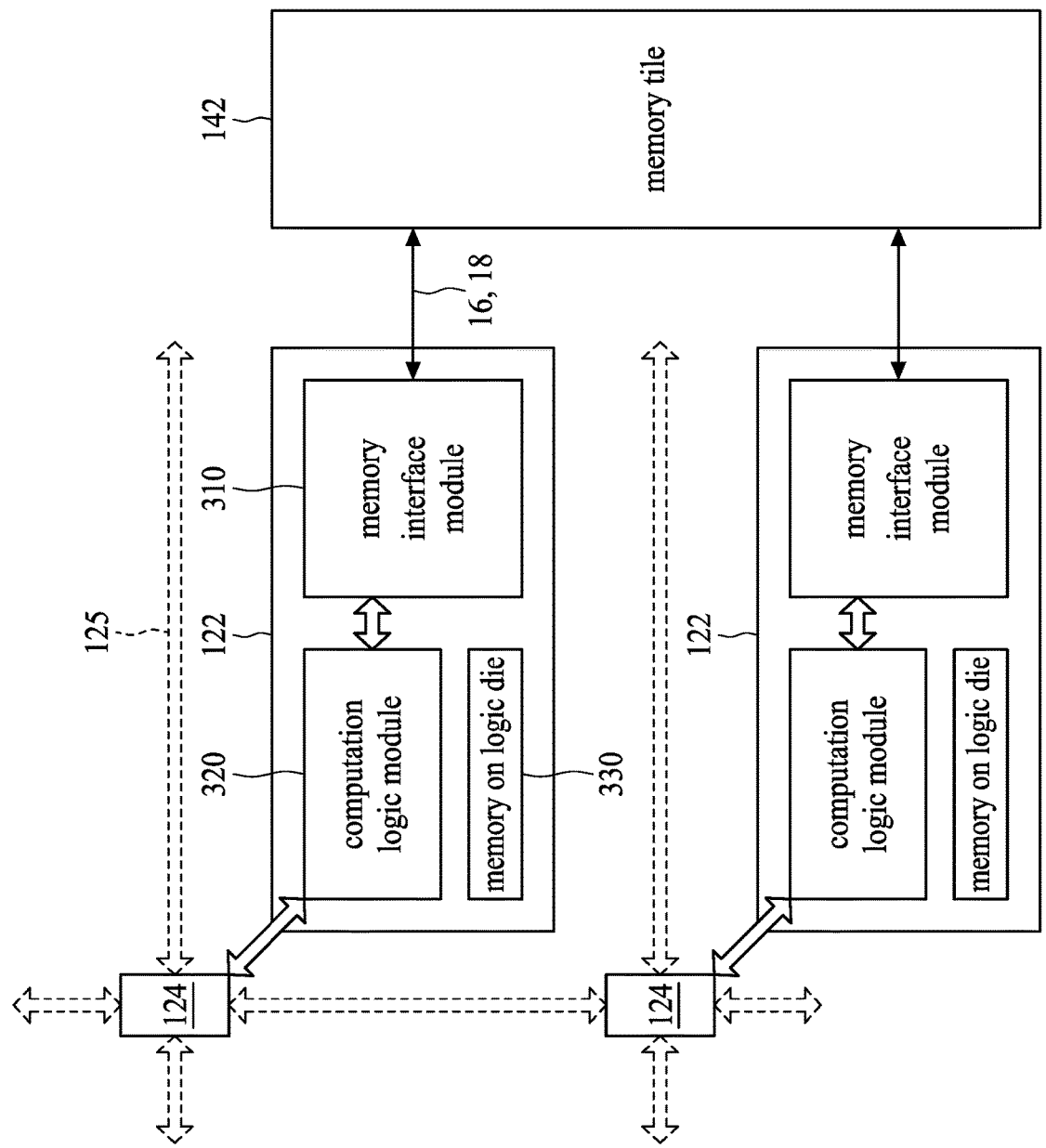
FIG. 8 is a schematic diagram illustrating the communication among a processor core, a network on chip and a memory tile according to a second embodiment.

FIG. 8 is a schematic diagram illustrating the communication between the processor cores, the network on chip, and the memory tile according to a second embodiment. Reference is made to FIG. 1 and FIG. 8; the memory tiles 142 is communicatively coupled to a plurality of processor cores 122 via the connection structure 16 and 18 shown in FIG. 1. Specifically, a memory tile 142 can be coupled to two processor cores 122; this means that two processor cores 122 share a single memory tile 142. Compared to the first embodiment in which each processor core 122 has a dedicated memory tile 142, multiple processor cores 122 sharing a memory tile 142 can reduce hardware and power costs; except that in the configuration of the second embodiment, if one processor core 122 is accessing the memory block 142, the other processor core 122 may have to wait, thus reducing the performance. In certain embodiments, the processor 20 may juxtapose the processor cores 122 performing the same task with the shared memory tile 142. In FIG. 8, each processor core 122 includes a memory interface module 310 and a computation logic module 320, wherein the memory interface module 310 may be electrically coupled to the metal pads 162 and 182 of a portion of the connection structures 16 and 18, and the computation logic module 320 can be selected from the computation logic module 320 shown in FIG. 5, FIG. 6 or FIG. 7; second, the computation logic module 320 may be communicatively coupled to the memory tile 142 directly via the memory interface module 310 as shown in FIG. 7, or may be coupled to the memory interface module 310 via the memory on logic die 330 as shown in FIG. 5 or FIG. 6.

Figure 9:
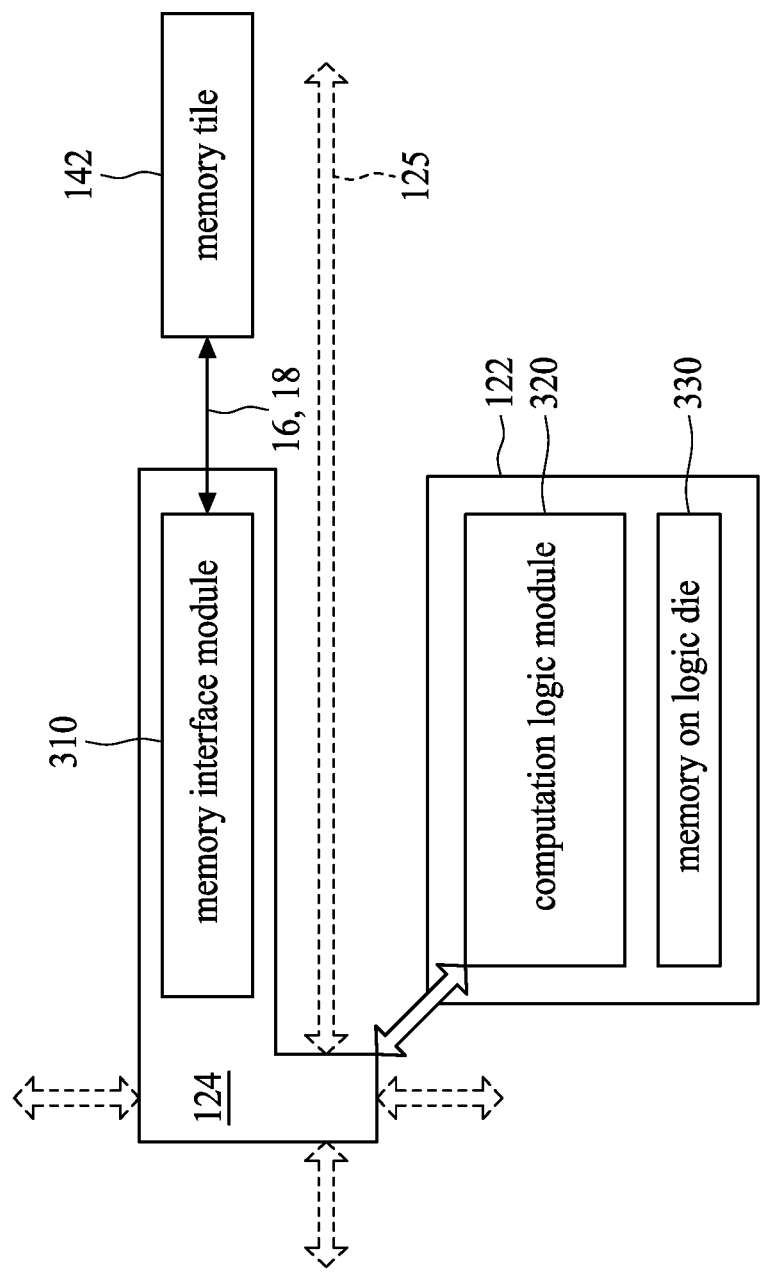
FIG. 9 is a schematic diagram illustrating the communication among a processor core, a network on chip and a memory tile according to a third embodiment.

FIG. 9 is a schematic diagram illustrating the communication between the processor cores, the network on chip, and the memory tile according to a third embodiment. Reference is made to FIG. 1 and FIG. 9; the memory tiles 142 is communicatively coupled to a single processor core 122 via the connection structure 16 and 18 shown in FIG. 1. Specifically, processor core 122 includes a computation logic module 320 that connects to a corresponding network on chip 124. The network on chip 124 includes a memory interface module 310, which may be electrically coupled to a portion of connection structures 16 and 18 of metal pads 162 and 182, and the computation logic module 320 in the processor core 122 is connected to the corresponding memory tiles 142 via the memory interface module 310 in the network on chip 124; in this way, the intermediate or final computation results obtained when the computation logic module 320 uses the training data set to train the neural network or uses the trained deep neural network to implement the machine intelligence process should be delivered by the network on chip 124 to the memory tile 142 for storage. Since the memory interface module 310 coupled to the memory tile 142 is arranged outside of the processing cores 122, all processing cores 122 in the processor 12 can read and write to any of the memory tiles 142 via the interconnected network on chip 124 and data path 125; in other words, the processor cores 122 can send messages via the network on chip 124 to request that memory tiles 142 that are not assigned to the processor cores 122 perform the storage operation. In this case, the access time to the data will vary depending on the distance between the processor core 122 and memory tile 142. For example, when accessing data on a memory tile 142 that is communicatively coupled to a processor cores 122 connected to an adjacent network on chip 124, the topology shown in FIG. 9 is able to obtain shorter access times than the topology shown in FIG. 4.

Figure 10:
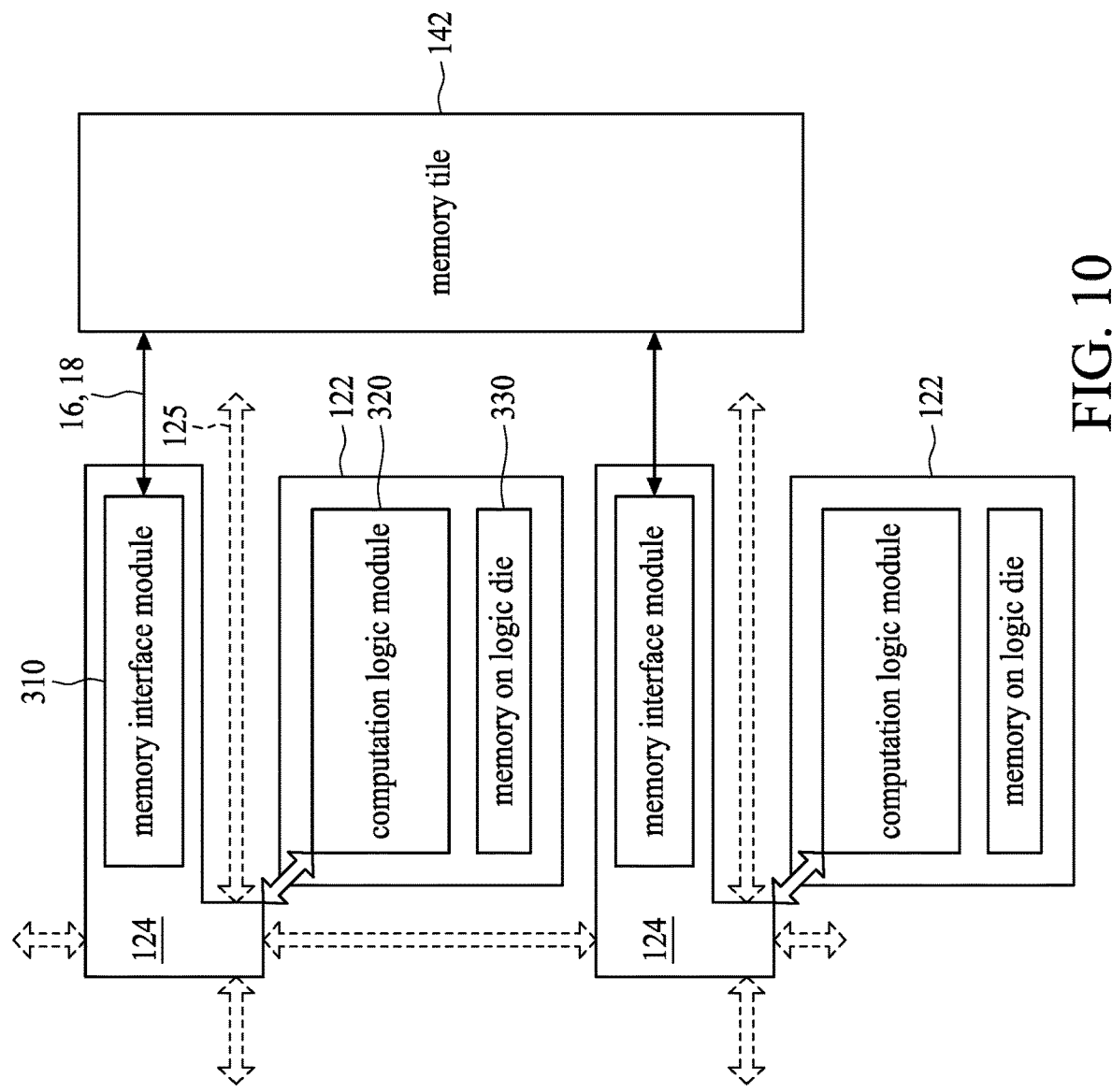
FIG. 10 is a schematic diagram illustrating the communication among a processor core, a network on chip and a memory tile according to a forth embodiment.

FIG. 10 is a schematic diagram illustrating the communication between the processor cores, the network on chip, and the memory tile according to a forth embodiment. Reference is made to FIG. 1 and FIG. 10; the memory tiles 142 is communicatively coupled to a plurality of processor cores 122 via the connection structure 16 and 18 shown in FIG. 1. Specifically, a memory tile 142 can be coupled to two processor cores 122 via two networks on chip 124. Each processor core 122 includes a memory interface module 310 and a computation logic module 320, wherein the memory interface module 310 may be electrically coupled to a portion of connection structures 16 and 18 of metal pads 162 and 182, and the computation logic module 320 may be the computation logic module 320 illustrated in FIG. 5, FIG. 6, or FIG. 7.

The foregoing outlines features of several embodiments of the present application so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A multi-core processor, used in performing parallel computation, and the multi-core processor comprising:
   a logic die, comprising:
      a plurality of processor cores, wherein each processor core is programmable; and
      a plurality of networks on chip, wherein the plurality of networks on chip correspondingly connected to the plurality of processor cores, so that the plurality of processor cores form a two-dimensional mesh network; and
   a memory die, vertically stacked with the processor core, the memory die comprising:
      a plurality of memory tiles, wherein when the multi-core processor performs the parallel computation, the plurality of memory tiles do not have cache coherency,
   wherein, the plurality of memory tiles correspond to the plurality of processor cores in a one-to-one or one-to-many manner,
   wherein, each processor core comprises:
      a computation logic module, coupled to the corresponding network on chip; and
      a memory interface module electrically coupled to corresponding the computation module and used in accessing the corresponding memory tile of the plurality of memory tiles without passing through the networks on chip, so that the computation logic module accesses the corresponding memory tile through the corresponding memory interface module without passing through the networks on chip, and wherein each of the computation logic module is allowed to access the corresponding memory tile and is unallowed to access the memory tiles other than the corresponding memory tile.

2. The multi-core processor of claim 1, wherein the plurality of memory tiles are respectively connected to one processor core of the plurality of processor cores, so that the plurality of memory tiles correspond to the plurality of processor cores in a one-to-one manner.

3. The multi-core processor of claim 1, wherein the plurality of memory tiles are respectively connected to a portion of processor cores in the plurality of processor cores, so that the plurality of memory tiles correspond to the plurality of processor cores in a one-to-many manner.

4. The multi-core processor of claim 1, wherein the memory interface module comprises a physical layer for coupling to the corresponding memory tile and a memory controller, so that each processor core can access the corresponding memory tile.

5. The multi-core processor of claim 4, wherein the computation logic module comprises:
   a central processing unit cluster, arranged to perform various types of parallel control and perform computation; and
   a matrix operator, coupled between the central processing unit cluster and the memory interface module, and configured to perform matrix computation on a large multidimensional matrix entering the processor core.

6. The multi-core processor of claim 5, wherein the computation logic module further comprises:
   a vector processor, coupled between the central processing unit cluster and the memory interface module, and configured to perform vector computation on vector inputted in the processor core.

7. The multi-core processor of claim 6, wherein the computation logic module further comprises:
   a data manager, coupled between the corresponding network on chip, the central processing unit cluster and the memory interface module, and arranged to selectively distribute work items or deliver data to the central processing unit cluster, the matrix operator, or the vector processor, depending on the data format.

8. The multi-core processor of claim 7, wherein each processor core further comprises:
   a memory on logic die, for use as a cache or a scratch memory of the processor core, and when the multi-core processor performs the parallel computation, the plurality of memories on logic die of the plurality of processor cores do not have cache coherency.

9. The multi-core processor of claim 8, wherein the memory on logic die is implemented by an SRAM.

10. The multi-core processor of claim 9, wherein the plurality of memories on logic die are coupled between the data manager, the vector processor, the matrix operator and the memory interface module.

11. The multi-core processor of claim 10, wherein each processor core further comprises an application-driven accelerator, coupled between the central processing unit cluster, the data manager and the memory on logic die.

12. The multi-core processor of claim 1, wherein the plurality of memory tiles are implemented by a DRAM.

13. The multi-core processor of claim 1, wherein the plurality of memory tiles are implemented by an SRAM.

14. The multi-core processor of claim 1, wherein the logic die is connected to the memory die in a hybrid bonding manner.

* * * * *